United States Patent [19]

Clitheroe

[11] 3,791,104

[45] Feb. 12, 1974

[54] HIGH ENERGY GAS-LIQUID CONTACTING PROCESS

[75] Inventor: Jay B. Clitheroe, Salt Lake City, Utah

[73] Assignee: Mineral & Chemical Resource Company, Houston, Tex.

[22] Filed: June 26, 1972

[21] Appl. No.: 266,333

[52] U.S. Cl. .................................... 55/86, 55/95
[51] Int. Cl. .................................... B01d 47/02
[58] Field of Search ...... 55/83, 84, 86, 92, 95, 230, 55/231, 232, 244, 247; 261/88, 121

[56] References Cited
UNITED STATES PATENTS 2,875,897 3/1959 Booth ............................. 209/169
3,648,435 3/1972 Sovia et al. ........................ 55/86

Primary Examiner—Charles N. Hart

[57] ABSTRACT

Gases and liquids, with or without solids suspended in either phase, are contacted within a closed chamber at high shear energy and internally recirculated for repeated contact within the closed chamber. Gas-liquid interface surface area is increased, thereby increasing gas diffusion rate into the liquid and promoting absorption of constituents from the gas stream into the liquid medium or reaction of solids within the liquid medium with a gaseous constituent.

5 Claims, 2 Drawing Figures 3,791,104

HIGH ENERGY GAS-LIQUID CONTACTING PROCESS

BACKGROUND OF THE INVENTION

1. Field of the Invention

The field of the invention is pollution control devices utilizing the mechanism of gas-liquid contact.

2. Description of the Prior Art

In the field of pollution control, many devices utilize the mechanism of gas-liquid contact to remove objectional constituents from a gas stream or from liquid waste. For example, certain constituent gases such as sulfur dioxide may be scrubbed from a composite gas stream or from air. Particulate matter and liquid aerosols suspended in a gas stream may also be removed by the gas-liquid contact process. Additionally, undesirable bio-organisms or other oxidizable components may be oxidized in a liquid stream by contacting the stream with an oxygen-containing gas.

Many devices and methods for contacting gases with liquids, or liquids with solids suspended therein, utilize high gas flow rates and low gas-liquid contact time to achieve mixing of the liquid medium and gas stream. Such devices include wet or ejector venturis, flooded discs and packed columns. Many types of liquid spray and turbine-spray techniques, combined with packed beds or towers and generally associated with centrifugal or packed tower separator techniques are also used. Most of these devices and methods stress the necessity for high gas throughput per volume of liquid of low gas-liquid contact time in order to handle large gas volumes for various industrial applications. Generally, these devices and methods can remove a large quantity of pollutant per unit time as a result of high gas flow, but are not capable of reducing pollution levels sufficiently to satisfy recent and more stringent gas and liquid effluent standards promulgated by various governmental agencies. As the particle size or aerosol mist average droplet size in a gas-borne pollutant decreases, the scrubbers of the prior art are less and less effective. Although a series of scrubbers may be used to sequentially contact the gas and liquid streams, cost of installation is excessive and incremental improvement in overall pollutant removal may be satisfactory.

For a general treatment of the state of the pollution control art, see Lund, *Industrial Pollution Control Handbook*, Ch. 22 and 23 (1971).

SUMMARY OF THE INVENTION

The invention resides in the use of high energy gas-liquid contacting to remove pollutants from gases or liquid medium by high velocity internal recirculation and intimate gas-liquid contact. The gas stream is dispersed with high energy into the liquid medium and the gasified liquid medium is recirculated internally within the closed container to repeatedly contact the gas stream and the liqud medium. A component of the composite gas stream is thereby absorbed into the liquid medium, as in the case of particulate or aerosol mist contaminants, or is reacted with the liquid medium or a solid dispersed in the liquid.

The method of the invention effectively transfers extremely high percentages of contaminants or reactants from the gas stream into the liquid medium by reducing the dependency of absorption efficiency on gas diffusion rate.

BRIEF DESCRIPTION OF THE DRAWINGS

Apparatus in which the inventor's presently preferred embodiment of the invention may be practiced are shown in the drawings. In the drawings.

DESCRIPTION OF THE PREFERRED EMBODIMENT

The inventor's presently preferred embodiment of the invention includes the steps of inducing a gas stream into a liquid medium at high shear energy and recirculating the gasified liquid medium repeatedly through the inducing step within the chamber, thereby maintaining the gas stream and the liquid medium in intimate contact for an extended time period. The gas stream may be internally recirculated after separation from the liquid medium and again be passed with untreated gas through the inducing step.

Figure 1:
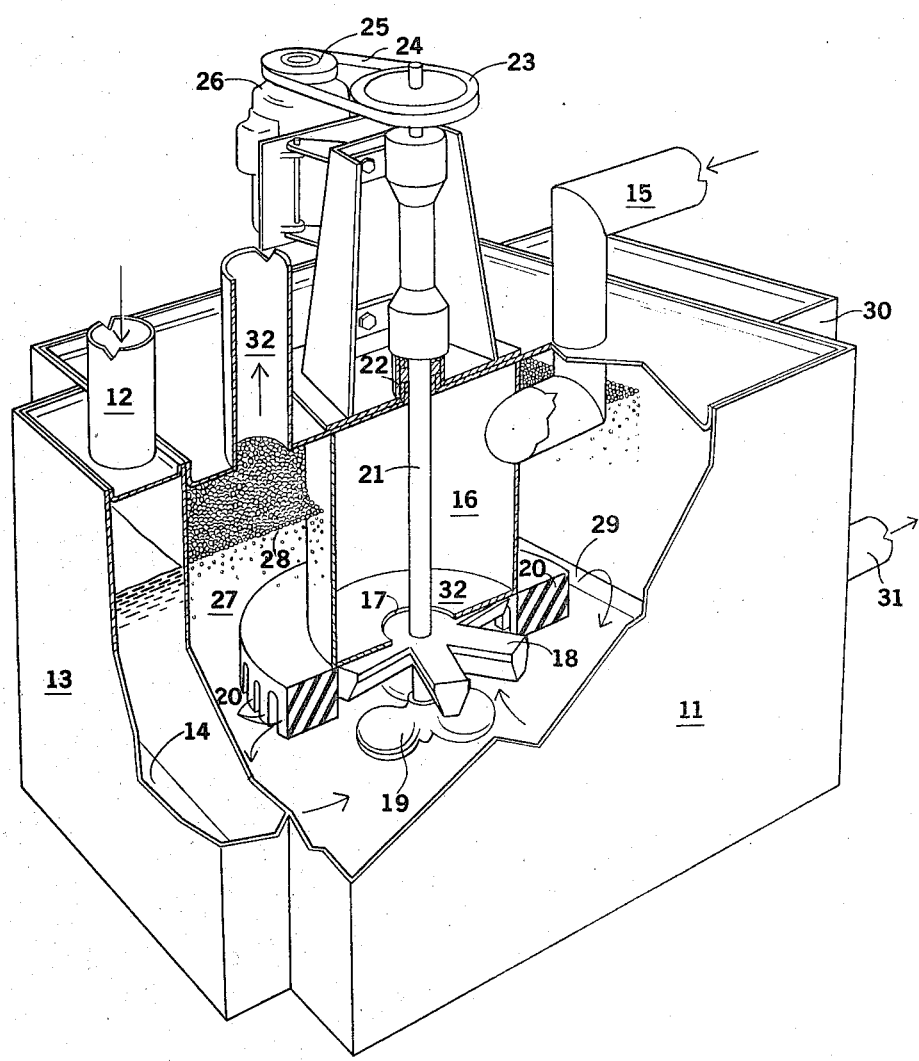
FIG. 1 is a perspective view in partial section and partial cutaway form of a single unit for utilizing the process of the invention.

One apparatus which efficiently accomplishes the method is shown in FIG. 1. A closed chamber 11 is shown having liquid medium inlet 12 by which a liquid absorbent or a liquid with solids suspended therein is pumped into a slush box 13 and passes through an opening 14 into chamber 11. It is to be understood that the term "liquid medium" may take the form of a slurry of solid particles dispersed in liquid, an emulsion, a liquid or mixture of liquids. Various applications of the invention may require different kinds of absorbent or reactant liquid media.

Chamber 11 also includes a gas inlet 15 which conveys an untreated composite gas stream to a supply chamber 16. For the purposes of this description, a composite gas stream is defined as a gas stream which contains a number of different constituent gases or gases plus particulates or fine droplets of liquid dispersed therein. The untreated gas flows from supply chamber 16 through an aperture 17 in the bottom plate 32 by the induction action of the rotating impeller 18 in cooperation with the screw propeller 19. A small vertical separation of bottom plate 32 and impeller 18 aids the induction of the feed gas. The action of screw propeller 19 impinges a flow of liquid medium substantially transversely of the plane of rotation of impeller 18 and forms a liquid seal much in the same manner as the housing for a centrifugal pump. Th liquid medium is then propelled generally radially of the lane of rotation of impeller 18 by centrifugal force. As the liquid medium and induced gas from aperture 17 are mixed by the action of impeller 18, the mixture is propelled outward and collides with a radially inner edge of one of the downwardly depending stators 20. The radial length of stator 20 may be any practical dimension. The purpose of stator 20 is to provide a surface against which the mixture may be sheared, causing bubbles to form, break and reform. Although a lengthened radial dimension of stator 20 may provide a slightly different circulation pattern within chamber 11, the gas-liquid medium mixture may be impinged on stators of any radial length which will not substantially reduce the turbulence within the liquid medium.

The combined high speed rotation of impeller 18 and collision of the centrifugally impelled liquid-gas mixture with stators 20 shears the mixture with high kinetic energy and forms minute bubbles in the mixture. The sheared liquid-gas mixture (and any solids, if present) then circulates within chamber 11 along the path generally shown by the arrows in the liquid medium 27. The centrifugal ejection velocity from impeller 18 is high for the liquid medium circulation, on the order of 40 feet per second. The gasified liquid medium is ejected outwardly, and in a short period of time is repeatedly propelled upwardly by screw propeller 19, impelled outwardly and mixed with gas from aperture 17 by impeller 18, and sheared by impeller 18 and stators 20. The repeated internal recirculation of the liquid medium and extended period of contact for the gas stream and liquid medium promote removal of contaminants or reactant gases from gas inlet 15.

Impeller 18 is supported by axle 21 which protrudes from supply chamber 16 through a gas-tight bearing 22, and is connected to a drive pulley 23. Drive pulley 23 is rotated by a V-belt 24, which is in turn driven by a motor pulley 25 and a motor 26. Motor 26 is operated at sufficient speed to drive shaft 21 with impeller 18 and screw propeller 19 at sufficient revolutions per minute to yield the desired peripheral speed for impeller 18. The speed at which impeller 18 is rotated is, to some degree, dependent not only upon the diameter of impeller 18, but also on the size of chamber 11, the viscosity of the liquid medium and suspension characteristics of any solids present in the liquid medium.

The liquid medium 27 fills chamber 11 to the liquid medium level 28. As can be seen in FIG. 1, screw propeller 19, impeller 18 and aperture 17 are fully beneath liquid medium level 28, thereby assuring that the gas from aperture 17 is dispersed into the body of liquid medium 27. Preferably, after a period of process operation chamber 11 will be filled to liquid medium level 28 with substantially a foam. The formation of a foam assures maximum surface area of the gas-liquid interface in the gasified liquid medium and reduces power consumption by reducing the apparent density and viscosity of the liquid medium. However, the proper agitation and time of intimate contact can be achieved in the method without the formation of a foam.

As impeller 18 rotates and contacts the liquid medium with the gas entering the area of contact through aperture 17, the apparent density of liquid medium 27 is reduced by the induction of the gas in minute bubble form. The same condition will exist, or course, if the liquid medium contains a dispersion of solid particles, or reactants, therein. The apparent density of such a slurry would be reduced just as that of a pure liquid would be reduced, and high gas-liquid interface contact is promoted by the high shear energy which induces formation of bubbles of gas in the liquid medium.

Most reactions which are aided by the preferred embodiment of the process occur in the liquid phase. If a slurry is utilized as the liquid medium, the solid particles dispersed throughout the slurry may furnish reactants to the solution or ions on the solid particle surfaces to react with constituents of the gas stream. The reactions, therefore, may be characterized as gas-liquid reactions, but a solid may be present in slurry form to furnish reactants.

After the slurry, or liquid medium 27, has absorbed an amount of the desired constituent of the gas deemed to be efficient or economic, the spent liquid or slurry exists chamber 11 through the effluent opening 29 into a holding box 30 and out the effluent pipe 31 to waste or to be recycled. Gas is separated from liquid medium 27 at liquid medium level 28 by percolation and the breaking of the tiny bubbles formed within chamber 11 and passes out the gas exit 32 to the atmosphere or to undergo other steps in subsequent operations.

Figure 2:
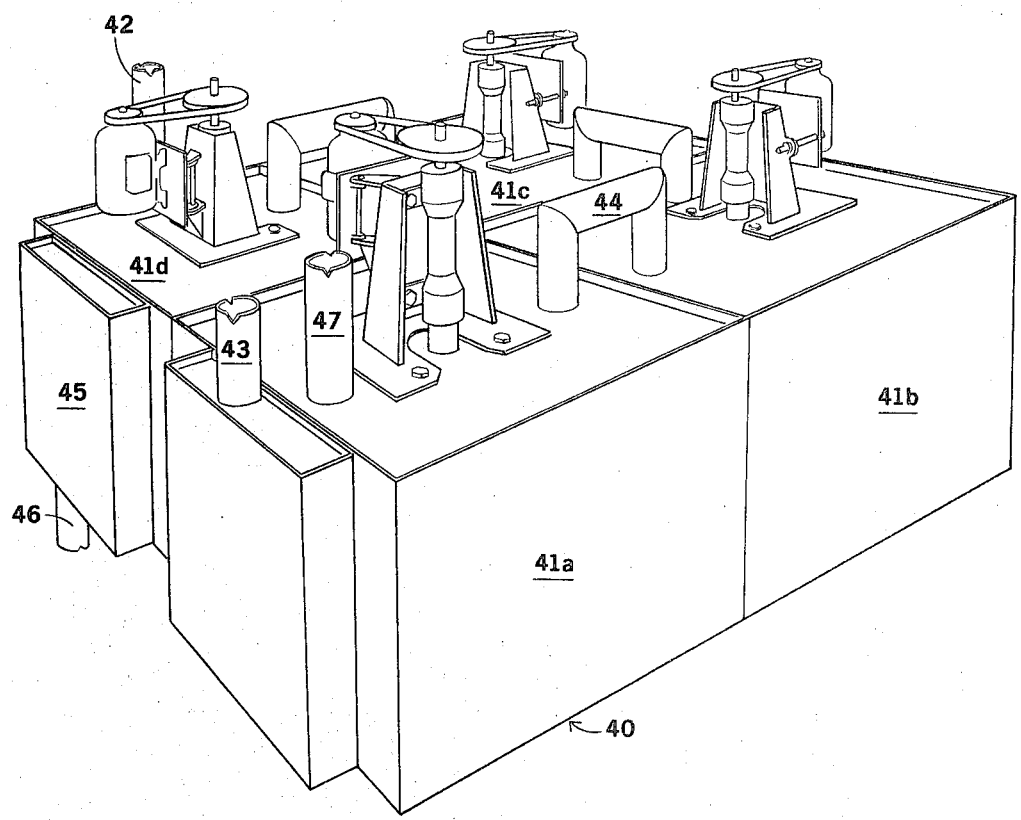
FIG. 2 is a perspective view of a multiple unit system utilizing a series of the device shown in FIG. 1.

The apparatus shown in FIG. 2 is a system of four of the devices shown in FIG. 1 and may be utilized to incrementally treat contaminated liquids or gases or to react slurries with gases as described for the apparatus in FIG. 1. The apparatus 40 includes four closed chambers 41a, 41b, 41c and 41d in which gas supply chambers, gas supply apertures, impellers, screw propellers, and stators (none of which are shown) similar to those described for the apparatus of FIG. 1, contact liquid medium and gas therein. The apparatus 40 includes a feed gas conduit 42, and a liquid medium feed conduit 43 for countercurrent flow of feed gas and liquid medium. Liquid medium enters liquid medium feed conduit 43 and proceeds through chamber 41a to be contacted with the gas which has been previously contacted and then separated in chamber 41b and piped into chamber 41a by the conduit 44. After the liquid medium has been sufficiently contacted with the gas from gas conduit 44 in chamber 41a, the liquid medium is transferred to chamber 41b, and then to 41c, and then 41d in series. The spent liquid medium is then transferred into the liquid effluent box 45, and then may be either recycled or conveyed to waste through a waste conduit 46. Feed gas enters through feed gas conduit 42 and is sequentially contacted with and separated from the circulating liquid medium in chambers 41d, 41c, 41b and 41a in sequence until the treated or reacted gas is removed from the system by the treated gas pipe 47. It is to be understood that gas may be supplied to the apparatus as shown in either FIG. 1 or FIG. 2 under pressure, under induced flow by vacuum apparatus downstream of treated gas pipe 47, or gas flow may be self-induced by the action of the gas inducing impeller 18 (FIG. 1). Further, flow rates between individual chamber 41a, 41b, 41c, 41d within apparatus 40 may be controlled by appropriate liquid level controls (not shown) and gas valves (not shown) in order to keep liquid levels and gas flow rates at optimum parameters.

The absorption of the constituent of a gas stream by the liquid medium involves two phenomena; i.e., chemical reaction rate or solubility rate of the gas in the liquid and gaseous diffusion rate. The chemical reaction rate or solubility rate for a specific gas and liquid is fixed by concentration, temperature and pressure of the system. The diffusion rate under those same conditions, however, can be increased substantially by continual, rapid and repeated bubble shearing action. In conventional venturi or impingement type absorbers, the overall process is diffusion dependent. This invention, with its enormous bubble shearing rate capacity can render the overall process more nearly reaction dependent.

In an embodiment of the process in which $SO_2$ is to be removed from a gas stream such as smelter stack gases or other industrial effluent gases, the apparatus may be beneficially used to contact the effluent gas with a water slurry of material which reacts with $SO_2$ such as limestone, dolomite, an alkali hydroxide, or an adsorbent such as activated charcoal. Referring to FIG. 1, the $SO_2$-containing gas to be treated would be piped to the apparatus by gas inlet 15, into supply chamber 16 and induced into the slurry through aperture 17 by the action of impeller 18 and screw propeller 19. The partially gasified liquid would then be impinged upon stators 20 and the bubbles formed by impeller 18 inducing gas into the liquid medium would be broken, sheared and reformed. The gasified liquid medium is circulated as shown by the arrows in liquid medium 27 for intimate contact of the $SO_2$ with the slightly soluble calcium or magnesium compounds. The calcium sulfite formed in this embodiment of the process is then removed from the system through effluent pipe 31. The very fine bubbles of $SO_2$-containing gas formed by the inducing step provide a very high ratio of interface surface area to gas volume and promote absorption of $SO_2$ by the liquid medium.

The high energy circulation of liquid medium 27 within container 11 has an additional advantage in the case that a liquid slurry is used as absorbent or reactant for a constituent of the gas stream. The high energy shearing action and circulation achieved in accordance with the teaching of the present invention abrades away the reacted outer layers on solid surfaces to constantly present fresh unreacted solid surfaces to the incoming gas and to the liquid medium in which the particle is suspended. This abrading of the particle surface additionally increases the efficiency of the gas constituent removal and utilization of the solid reactant. Another advantage of this method is that the high velocity circulation prevents insoluble reaction products, such as calcium sulfite or calcium sulfate, for building up as a scale on mechanism and vessel surfaces.

It will be understood that the energy requirements of the present invention are higher per unit of pollutant removed than for the process taught in the prior art. In order to effectively circulate volumes of liquid medium for extended periods and minimize diffusion dependency of absorption or reaction, energy requirements are high. The increase in diffusion rate and absorption efficiency is directly related to the amount of energy put into the process by mixing, shearing and circulation. The effectiveness of the high energy contacting may be observed by the removal of substantially higher percentages of pollutant.

Another example of use of the process is the removal of aerosol mists or particulates from a gas stream. Aerosol mists which are particularly difficult to remove from a gas stream, such as those from the sulfuric acid plant, may be effectively removed by use of the present process. Particulate matter of small average diameter, such as that emanating from smelting operations or melt processing plants, may be effectively absorbed by a liquid medium utilizing the present process. The high energy shearing action and extremely fine bubble or foam formation within the liquid medium promotes maximum surface area contact for absorbing very small diameter mists and particles from the gas stream. For example, sulfuric acid mist is extremely difficult to remove from a gas stream by water spraying or packed column techniques or the like. The average size of a droplet of sulfuric acid mist may be less than 1 micron. The extended retention time for the present process coupled with the high energy mixing of gas and liquid medium effectively removes up to 99 percent of such a mist.

One other example of an application of the process is that of stripping weakly soluble gases or high vapor pressure gases from their liquid solution into a gas stream. For example, $H_2S$ has successfully been stripped from sour water by the present process using atmospheric air as the feed gas an hydrofluosilicic acid has been successfully stripped from green phosphoric acid using air as the feed gas.

Yet another example of an application of the process is that of oxidizing bio-organisms in sewage by contacting the liquid medium containing sewage as solid and colloidal suspensions with an oxygen-containing gas such as air. This example is not to be taken as a limitation of the process. Any plant effluent with high chemical or biological oxygen demand may be effectively treated in accordance with the present invention. Brewery effluent or other industrial wastes may be contacted with oxygen containing gas to reduce the chemical or biological oxygen demand and render the plant effluent acceptable by the applicable pollution standards. Oxidation of ferrous to ferric ions, sulfite to sulfate ions, carbon monoxide to carbon dioxide and hydrolysis of gaseous ammonia to ammonium ions are other applications of the present invention The gas feed rate that can be induced without assistance of an external gas booster varies according to liquid or slurry viscosity, equilibrium temperature, impeller speed and other parameters from zero to about 20 cubic feet of feed gas per minute per cubic foot of liquid volume. With the optional use of an external booster, effective absorption can be obtained up to about 40 c.f.m. per cubic foot of liquid volume. The ratio of the diameter of the impeller blades to chamber diameter should be held to about 0.33, and the peripheral speed of impeller 18 should be held in the range of approximately 26 to 40 feet per second in order to maintain proper circulation of the liquid medium within the chamber. The object of impeller speed is to induce a practical gas feed rate and to provide the proper bubble shearing rate. The bubble shearing rate is obtained by multiplying the number of blades on impeller 18 times r.p.m. of impeller 18 times the number of stators 20. Bubble shearing rate may vary from 60,000 to 120,000. The shape of impeller 18 is preferably triangular in cross-section, but may be any shape which will induce efficient gas flow and provide proper mixing and shearing of gas and liquid medium within chamber 11 of the apparatus. It has been found that the proper ratio of diameters of impeller 18 to screw propeller 19 is about 4:3.

In laboratory tests utilizing one embodiment of the invention, gas streams of 8,000 and 16,000 c.c./minute containing 600 p.p.m. $H_2S$ and 300 p.p.m. $SO_2$ were dispersed into solutions containing 50g. NaOH in 1,500 c.c. of water for the 8,000 c.c./minute test and 100 g. NaOH in 1,500 c.c. of water for the 16,000 c.c./minute test. Both the $H_2S$ and the $SO_2$ were quantitatively fixed in the NaOH solution, and no leakage of acid gas was detected downstream of the high energy absorber over test periods which varied from 1 hour to 33 hours in length.

In pilot tests of apparatus utilizing the invention, feed gas containing 6,250 p.p.m. $SO_2$ was induced by the apparatus and contacted with a slurry of 5 percent by weight of hydrated lime in water. The volume of the contacting chamber was about 32 cubic feet, and the circulation mechanism included an impeller with six blades, 17 inches in diameter and had 24 stators. The apparatus operated with a self-induced gas flow of 200 cubic feet per minute. Analysis showed that the effluent gas from the process contained an average of 120 p.p.m. $SO_2$ during test runs.

With all other parameters held the same, an external gas flow booster was added to increase feed gas flow to 400 cubic feed per minute and effluent during operations averaged approximately 240 p.p.m. $SO_2$. It is to be understood that these single stage batch tests are to be taken as illustrative only and are not intended to limit the scope of the invention. Liquid or slurry flow rates depend upon the amount of soluble constituent in the feed gas, allowable concentration of that soluble constituent in the liquid and the allowable concentration of the ultimate reaction product in the liquid or slurry.

Thus it can be seen that an improved method for contacting gas streams with liquid medium has been shown. Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangements of parts for an apparatus in which the process may be carried out. For example, equivalent elements or steps may be substituted for those illustrated and described herein, the sequence of steps may be reversed, and certain features of the invention may be utilized independently of the use of other features, all as would be apparent to one skilled in the art after having the benefit of this description of the invention.

What is claimed is:

1. In a gas-liquid contacting process, the combination of steps comprising:
    circulating a composite gas stream to a closed chamber;
    circulating liquid medium to said closed chamber;
    absorbing constituents of said gas stream by dispersing said gas stream into a body of said liquid medium by the application of high shear energy into said liquid medium;
    recirculating said gasified liquid medium repeatedly through said absorbing step within said chamber, thereby maintaining said gas stream and said liquid medium in contact for an extended time period;
    separating gas from which constituents have been absorbed from said liquid medium;
    and, passing separated gas from said chamber.

2. The invention as claimed in claim 1, including the additional steps of:
    recirculating to said chamber at least a portion of the dispersed and then separated gas stream to said absorbing step;
    and, repeatedly dispersing said portion of said gas stream into said gasified liquid medium by application of high shear energy through said liquid medium.

3. In a gas-liquid contacting process, the combination of steps comprising:
    circulating a gas stream containing a pollutant to a closed chamber;
    circulating liquid medium to said closed chamber;
    reducing the apparent density of a body of said liquid medium and increasing gas-liquid interfacial contact by inducing said gas stream by applying high shear energy through said liquid medium, thereby creating finely dispersed bubbles of said gas in said liquid medium;
    recirculating gasified liquid medium through said reducing step within said chamber, thereby maintaining said increased gas-liquid interface contact for an extended time period;
    separating said induced gas stream from said liquid medium;
    and, passing said separated gas stream from said chamber.

4. The invention as claimed in claim 3, including the additional steps of:
    recirculating to said reducing step within said chamber at least a portion of said gas stream which has been induced into said liquid medium and then separated;
    and, repeatedly dispersing said recirculated portion of said gas stream into said gasified liquid medium.

5. In a gas-liquid contacting process, the combination of steps comprising:
    circulating a composite gas stream to a closed chamber;
    circulating liquid medium to said closed chamber;
    dispersing said gas stream into a body of said liquid at high shear energy by:
        a. impinging a flow of said liquid medium directly on a rotating impeller substantially transversely of said impeller's plane of rotation;
        b. impinging said gas stream on said plane of rotation;
        c. centrifugally ejecting the mixture formed by said impinging steps radially of said plane of rotation;
        d. and, shearing the gas bubbles formed in said mixture on stationary members adjacent and circumferentially spaced about said impeller;
    recirculating said mixture repeatedly through said dispersing step within said chamber, thereby maintaining said gas stream and said liquid medium in contact for an extended time period;
    separating gas from which constituents have been removed from said liquid medium;
    and, passing the unabsorbed portion of said gas from said chamber.

* * * * *

UNITED STATES PATENT OFFICE
CERTIFICATE OF CORRECTION

Patent No. 3,791,104          Dated February 12, 1974

Inventor(s) Jay B. Clitheroe

It is certified that error appears in the above-identified patent and that said Letters Patent are hereby corrected as shown below:

Col. 1, l. 31, "of", second occurrence, should read "and".

Col. 1, l. 45, following "may", insert "not".

Col. 2, l. 10, "device" should read "devices".

Col. 2, l. 52, "lane" should read "plane".

Col. 3, l. 68, "exists" should read "exits".

Col. 5, l. 53, "melt" should read "metal".

Col. 6, l. 22, insert "." after "invention".

Signed and sealed this 21st day of May 1974.

(SEAL)
Attest:

EDWARD M. FLETCHER, JR.
Attesting Officer

C. MARSHALL DANN
Commissioner of Patents